(12) United States Patent
Osada et al.

(10) Patent No.: US 8,349,439 B2
(45) Date of Patent: Jan. 8, 2013

(54) MULTILAYERED FILM AND MOLDED ARTICLE

(75) Inventors: Syunichi Osada, Shiga (JP); Kazunori Sonoda, Shiga (JP); Norifumi Matsubara, Tokyo (JP)

(73) Assignee: Toray Industries, Inc. (JP)

( * ) Notice: Subject to any disclaimer, the term of this patent is extended or adjusted under 35 U.S.C. 154(b) by 477 days.

(21) Appl. No.: 12/525,901

(22) PCT Filed: Feb. 12, 2008

(86) PCT No.: PCT/JP2008/052223
§ 371 (c)(1),
(2), (4) Date: Aug. 5, 2009

(87) PCT Pub. No.: WO2008/099797
PCT Pub. Date: Aug. 21, 2008

(65) Prior Publication Data
US 2010/0323159 A1    Dec. 23, 2010

(30) Foreign Application Priority Data

Feb. 15, 2007    (JP) ................................ 2007-034423

(51) Int. Cl.
*B32B 7/02*    (2006.01)
(52) U.S. Cl. .......................... 428/212; 428/141; 428/220
(58) Field of Classification Search .................. 428/141, 428/212, 220
See application file for complete search history.

(56) References Cited

U.S. PATENT DOCUMENTS

| 4,603,073 A | * | 7/1986 | Renalls et al. ................ 428/147 |
| 5,832,327 A | * | 11/1998 | Matsuura ...................... 396/512 |
| 6,576,329 B2 | * | 6/2003 | Kong ............................ 428/213 |
| 6,652,979 B1 | | 11/2003 | Takahashi et al. |
| 2003/0108775 A1 | | 6/2003 | Kobayashi et al. |
| 2004/0219316 A1 | | 11/2004 | Takahashi et al. |
| 2005/0031880 A1 | | 2/2005 | Kobayashi et al. |

FOREIGN PATENT DOCUMENTS

| JP | 6-031874 A | 2/1994 |
| JP | 6-031875 A | 2/1994 |
| JP | 2001-220453 A | 8/2001 |
| JP | 2002-275425 A | 9/2002 |
| JP | 2002-292798 A | 10/2002 |
| JP | 2006-240034 A | 9/2006 |
| JP | 2006-257434 A | 9/2006 |
| JP | 2006-318524 A | 11/2006 |

OTHER PUBLICATIONS

Fukada et al (JP 2002-292798 machine translation), Oct. 9, 2002.*

* cited by examiner

*Primary Examiner* — Maria Veronica Ewald
*Assistant Examiner* — Lawrence Ferguson
(74) *Attorney, Agent, or Firm* — DLA Piper LLP (US)

(57) ABSTRACT

An ornamental film reflects an image on the surface of the film with high image clarity and having a deep and glossy jet-black color like the outer appearance of pianos. The film is a multilayered film including at least one resin layer (A layer) containing a black component; and at least one substantially colorless and transparent resin layer (B layer); the A layer having a thickness of not less than 20 μm and not more than 300 μm; the B layer having a thickness of not less than 0.5 μm and not more than 200 μm; the A layer and the B layer being arranged adjacently to each other; surface roughness Ra of at least one side surface of the film being not less than 1 nm and not more than 25 nm.

6 Claims, No Drawings

MULTILAYERED FILM AND MOLDED ARTICLE

RELATED APPLICATIONS

This is a §371 of International Application No. PCT/JP2008/052223, with an international filing date of Feb. 12, 2008 (WO 2008/099797 A1, published Aug. 21, 2008), which is based on Japanese Patent Application No. 2007-034423, filed Feb. 15, 2007.

TECHNICAL FIELD

This disclosure relates to a multilayered film and molded articles using the same.

BACKGROUND

In various applications such as cellular phones, personal computers, automobiles, televisions, household electrical appliances, pachinko and the like, ornaments and moldings employing a film are used. In these applications, white, metallic and black ornaments are used by preference, and particularly, an ornament film having a deep jet-black color like the outer appearance of pianos is now demanded because of increased preference of high class products.

As black sheets or containers, some proposals have been made. For example, in JP 6-031874 A, a multilayered sheet and multilayered container comprising a masking polyester resin layer, an adhesive resin layer and a polyolefin resin layer containing a shading pigment are proposed.

In JP 6-031875 A, a multilayered container which comprises a polyester resin layer, adhesive resin layer, masking resin layer and shading resin layer is proposed. Although these techniques slightly increase the gloss value of the sheet, the images reflected on the surface of the sheet do not have enough image clarity. Therefore, it was impossible to represent deep and glossy jet-black color like the outer appearance of pianos.

It could therefore be helpful to provide an ornamental film which reflects an image on the surface of the film with high image clarity and having a deep and glossy jet-black color like the outer appearance of pianos.

SUMMARY

We provide a multilayered film characterized by having at least one resin layer which comprises a black component (A layer) and at least one substantially colorless and transparent resin layer (B layer), wherein the thickness of the A layer is not less than 20 μm and not more than 300 μm, the thickness of the B layer is not less than 0.5 μm and not more than 200 μm, the A layer and the B layer are arranged adjacently to each other, and the surface roughness Ra of at least one side of the surfaces of the film is not less than 1 nm and not more than 25 nm.

Therefore, the multilayered film reflects an image with high image clarity on the surface of the film and shows deep jet-black color like the outer appearance of pianos. The multilayered film can prevent the occurrence of scratches and adhesion of dirt when the film comprises not less than 0.01 wt % and not more than 10 wt % of silicone compound. The multilayered film is one which is capable of being integrally-molded with a resin and/or integrated with a variety of functional layers, when the film has at least one resin layer (layer C) having a thickness of not less than 10 nm and not more than 300 nm comprising any one of acrylic compounds, polyester compounds and urethane compounds.

DETAILED DESCRIPTION

For attaining the above-described object, the multilayered film should comprise at least one resin layer (A layer) containing a black component; and at least one substantially colorless and transparent resin layer (B layer); wherein the A layer has a thickness of not less than 20 μm and not more than 300 μm; the B layer has a thickness of not less than 0.5 μm and not more than 200 μm; the A layer and the B layer are arranged adjacently to each other; and wherein the surface roughness Ra of at least one side surface of the film being not less than 1 nm and not more than 25 nm.

As used herein, "resin" may be any of thermoplastic resins, thermosetting resins, photosetting resins, electron beam setting resins and the like. More preferably, the resin is a thermoplastic resin. Preferred examples of thermoplastic resins include polyolefin resins such as polyethylene, polypropylene, and polymethylpentene; alicyclic polyolefin resins; polystyrene resins; polyamide resins such as nylon 6 and nylon 66; aramid resins; polyester resins such as polyethylene terephthalate, polybutylene terephthalate, polypropylene terephthalate, polybutyl succinate and polyethylene-2,6-naphthalate; polycarbonate resins; polyarylate resins; polyacetal resins; polyphenylene sulfide resins; fluorocarbon resins such as tetrafluoroethylene resins, trifluoro ethylene resins, chloro trifluoro ethylene resins, tetrafluoroethylene-hexafluoropropylene copolymer and vinylidene fluoride resins; acrylic resins such as PMMA; methacrylic resins; polyacetal resins; polyglycolic acid resins; polylactic acid resins; ABS resins and the like. Among these, particularly preferred are polyesters such as polyethylene terephthalate in view of strength, heat resistance, transparency and cost. These resins may be a homo-resin, or a copolymer or a blend of not less than two resins. In each of the resins, a variety of additives such as an antioxidant, antistatic agent, crystal nucleation agent, inorganic particles, organic particles, viscosity-reducing agent, heat stabilizer, lubricant and ultraviolet absorbing agent may be added.

Any of acrylic resins, urethane resins, epoxy resins, melamine resins, polyimide resins, phenol resins, or polyester resins may be employed as the thermosetting resin, photo setting resin and electron beam setting resin.

As used herein, "black component" means carbon black, iron black (triiron tetroxide), a black titanium pigment, perylene pigment/dye or the like. Carbon black is particularly preferable in view of high dispersibility in the resins and high masking ability. The content of carbon black in the multilayered film is preferably not less than 0.1 wt % and not more than 25 w %. The content of perylene pigment/dye in the multilayered film is preferably 0.05 g to 20 g/m$^2$. Highly ornamental black may not be obtained when the content of the perylene pigment/dye is not more than 0.5 g/m$^2$, due to low visible light absorption. On the other hand, when the content of the perylene pigment/dye is not less than 20 g/m$^2$, there arise problems with the amount of absorption of infra red rays and high cost, which is not preferred.

A preferred example is a film comprising at least one resin layer containing a black component (A layer) and at least one substantially colorless and transparent resin layer (B layer), wherein the thickness of the A layer is not less than 20 μm and not more than 300 μm and the thickness of the B layer is not less than 0.5 μm and 200 μm. This constitution enables to give a deep black film. More preferably, the thickness of the A layer is not less than 25 μm and not more than 200 μm, and the thickness of the B layer is not less than 3 μm and not more than 150 μm. In this case, improved ease of handling can be obtained. The substantially colorless and transparent resin layer preferably has a content of the particles, pigments and foreign substances in the layer, whose average particle diameter is not less than 5 nm, of not less than 0 wt % and not more than 0.05 wt % and has an absorption rate of the visible light of not more than 20%. More preferably, the content of the particles and foreign substances in the layer, whose average particle diameter is not less than 5 nm, is not less than 0 wt % and not more than 0.01 wt % and the absorption rate of the visible light of the layer is not more than 5%.

Further, the A layer and the B layer should be arranged adjacently to each other, and surface roughness Ra of at least one side surface of the film should be not less than 1 nm and not more than 25 nm. In this constitution, reflection at the interface between the A layer and the B layer can be inhibited thereby providing deeper black, and appropriate inhibition of the scattering at the surface provides gloss to the film. More preferably, surface roughness Ra of at least one side surface of the film is not less than 3 nm and not more than 10 nm. In this case, very high gloss is provided. Still more preferably, surface roughness Ra of the B layer side surface is not less than 3 nm and not more than 10 nm. In this case, the image reflected on the surface of the film has more improved sharpness and a film which has deep and glossy jet-black color like the outer appearance of pianos is obtained.

The multilayered film preferably comprises not less than 70 wt % of polyester. When the film comprises not less than 70 wt % of polyester, scattering and reflection inside the film are suppressed, and the film attains deeper black, along with improved moldability, heat resistance and solvent resistance. The layer A and layer B preferably comprise at least one of polyethylene terephthalate, copolymer resins of ethylene terephthalate, polyethylene naphthalate and copolymer resins of ethylene naphthalate. More preferably, the B layer comprises at least one of polyethylene naphthalate and copolymer resins of ethylene naphthalate. When the film comprises at least one of polyethylene naphthalate and copolymer resins of ethylene naphthalate, the film has a more glossy black, since the surface reflectance of the film is high due to high refractive indices of these resins.

The multilayered film preferably comprises not less than 0.01 wt % and not more than 10 wt % of a silicone compound. When the multilayered film comprises not less than 0.01 wt % and not less than 10 wt % of a silicone compound, the occurrence of scratches and adhesion of dirt are prevented due to improved abrasion resistance and antifouling properties. Since the impact resistance of the film also improves, burr or the like is hardly formed by punching in the molding process, so that the yield is increased. In cases where a silicone compound is directly added to the thermoplastic resin, GENIOPLAST commercially available from Wacker Asahikasei Silicone Co., Ltd or the like is preferably used. In this case, the bleeding out hardly occurs, and deterioration of performance and bleaching with time can be turned down.

$L^*(SCI)$ of one side of the multilayered film is preferably not less than 20 and not more than 35, $L^*(SCE)$ of the same is preferably not less than 2 and not more than 15 and $L^*(SCI)/L^*(SCE)$ of the same is not less than 3 and not more than 17. Here, $L^*(SCI)$ is luminance in accordance with ASTM E1164, determined from the specular reflection light (d/8) and a diffused light reflected on the surface of a sample, and $L^*(SCE)$ is luminance in accordance with ASTM E1164, determined from the diffused light from which the specular reflection light is removed. A film having an $L^*(SCI)$ of not less than 20 and not more than 35, an $L^*(SCE)$ of not less than 2 and not more than 15 and an $L^*(SCI)/L^*(SCE)$ of not less than 3 and not more than 17 is preferred because the film is more glossy while retaining the depth of black. This is thought to be because a more or less constant luminance is maintained by the highlight (specular reflection) while in the shade, the lower the luminance goes, the deeper the blackness is felt.

The multilayered film is preferably biaxially stretched. In the fine punching process of a speaker grille for television, a trouble in which a film breaks tends to occur, in the case of a normal unstretched film. On the other hand, if the film is biaxially stretched, the film does not tend to break, which reduces process loss.

In the multilayered film, the layer A preferably comprises an amorphous resin or a resin having a melting point of not higher than 240° C. If the A layer comprises an amorphous resin or a resin having a melting point of not lower than 240° C., voids hardly occur by fine punching process, molding or stretching, so that a deep jet-black color like the outer appearance of pianos can be maintained. More preferably, a black pigment-containing resin is prepared in which the black pigment is preliminarily dispersed in the amorphous resin or in the resin having a melting point of not higher than 240° C., and then the obtained black pigment-containing resin is mixed with other resin(s) for use.

Preferably, in the multilayered film, the resin which constitutes the A layer is an amorphous resin or a resin having a melting point of not higher than 240° C. and the multilayered film is biaxially stretched. In the case of normal biaxially stretched films, since tiny voids are formed between the black component and the resin during the stretching, the degree of blackness of the film tends to decrease. However, in cases where the resin constituting A layer is an amorphous resin or a resin having a melting point of not higher than 240° C., the A layer is slightly melted by the heat treatment after the biaxial stretching process to vanish the voids generated by stretching, so that the blackness of the film can be deeper.

The multilayered film preferably has at least one resin layer (C layer) having a thickness of not less than 10 nm and not more than 300 nm and comprising at least one of acrylic compounds, polyester compounds and urethane compounds. If the film has at least one such layer, adhesiveness on the surface of the film improves and properties of the film with a hard coating, antifouling layer, printing layer, bonding layer, sticking layer, ultraviolet absorption layer, diffusion layer, reflection layer, metal layer, or the like is promoted. The refractive index of the surface of the film may be adjusted, so that an appropriate gloss can be obtained and a film having deeper black can be provided.

Although the multilayered film should comprise at least two layers, the multilayered film more preferably comprises three layers. This is because, if the film comprises three layers, the film hardly curls when the film is subjected to heat history or the like. In this case, the B layers are preferably located on both sides of the A layer.

Further, on the surface of the multilayered film, a functional layer such as an adhesion-promoting layer, lubrication layer, hard coat layer, antistatic layer, abrasion resistant layer, anti-reflection layer, color correction layer, ultraviolet absorption layer, printing layer, metal layer, transparent conductive layer, gas barrier layer, hologram layer, release layer, sticking layer, embossing layer or adhesive layer may be formed.

The molded article should comprise the above-described multilayered film. In addition to the multilayered film, the molded article preferably comprises any one of hard coat layer, embossing layer, weatherproof layer (UV-cut layer), color layer, adhesive layer, base resin layer and the like.

Because various molding methods such as vacuum forming, vacuum pressure forming, plug assisted vacuum pressure forming, ultra-high pressure molding, in-mold molding, insert molding, cold molding, press molding, punching processing and the like may be applied to the production of the molded article, it is possible to obtain the molded article at a low cost. The molded article is suitable as a decoration material for automobile interiors and exteriors, mobile phones, televisions, a variety of household electrical appliances, building parts and the like.

Next, one method of producing the multilayered film will be described below.

Two kinds of resins, resin A and resin B, in the form of pellets or the like are provided. The resin A preferably contains a pigment or dye. Preferably, the resin A comprises carbon black. An average particle size of the carbon black is preferably not less than 5 nm and not more than 3000 nm. When the average particle size of the carbon black is less than 5 nm, increase in the viscosity of the resin is high, so that extrusion stability or stacking ability of the resin is deteriorated. On the other hand, if the average size of the carbon black is more than 3000 nm, scattering is large, so that a deep black color is hardly obtained. Addition of the carbon black to the resin is preferably conducted by a method in which the carbon black is compounded with the resin A to a high concentration, and the resulting mixture is blended to the resin A alone to dilute the mixture when it is fed to an extruder.

The pellets are, as required, dried in hot air or under vacuum, and then fed into separate extruders. In each extruder, the resin is heated to melt at a temperature not lower than the melting point, and the extrusion amount is uniformized with a gear pump or the like, and foreign substances, modified thermoplastic resin and the like are removed by filtration.

The resin A and resin B from different channels using these two or more different extruders are then fed to a compositing apparatus. As the compositing apparatus, multi-manifold die, feed block, static mixer or the like may be used. Any combinations of these may be used. The melt multilayered body formed into a desired layer constitution by the compositing apparatus is formed into a desired shape with a die and then extruded. The multilayered sheet extruded from the die is extruded onto a cooling body such as a casting drum, and cooled to solidify to obtain a casting film. In this case, it is preferred to bring the sheet into close contact with the cooling body such as a casting drum by electrostatic force using an electrode in the form of a wire, tape, needle, knife or the like so as to quickly solidify the sheet. It is also preferred to bring the sheet into close contact with the cooling body such as a casting drum by blowing air from an apparatus in the form of a slit, spot or plane so as to quickly solidify the sheet, or by using nip rolls.

The thus obtained casting film is preferably biaxially stretched as required. Biaxial stretching means stretching in the longitudinal direction and the transverse direction. The stretching may be performed by stretching in two directions sequentially or simultaneously. A re-stretching in the longitudinal direction and/or in the transverse direction may be performed. Particularly, a simultaneous biaxial stretching by the tenter method is preferably employed in view of inhibiting orientation variation in the plane of the film and inhibiting surface scratches.

First, the case of sequential biaxial stretching will be described. Hereinafter, stretching in the longitudinal direction means a stretching to provide the film with a molecular orientation in the longitudinal direction, and this stretching is usually conducted utilizing the difference in circumferential speed of rollers. This stretching may be performed in one step or may be performed in multiple steps using a plurality of pairs of rollers. Although the draw ratio of the stretching of the film varies depending on the kind of resin, usually the ratio from 2× to 15× is preferred. In cases where polyethylene terephthalate is used for at least one of the resins constituting the multilayered film, the ratio from 2× to 7× is particularly preferably employed. For a drawing temperature, a temperature between the glass transition temperature of the resin constituting the multilayered film and the glass transition temperature plus 100° C. is preferred.

To the thus obtained uniaxially stretched film, a surface treatment such as corona treatment, flame treatment or plasma treatment is applied as required, and thereafter, a function such as easy lubrication, adhesiveness, antistatic properties may be added by inline coating.

Stretching in the transverse direction means a stretching to provide the film with a molecular orientation in the transverse direction, and this stretching is usually conducted by stretching the film in the transverse direction by conveying the film while clamping the both sides of the film using a tenter. Although the draw ratio of the stretching of the film may vary depending on the kind of the resins, usually the ratio from 2× to 15× is preferred, and when polyethylene terephthalate is used as at least one resin constituting the multilayered film, a ratio of 2× to 7× is particularly preferably employed. As a drawing temperature, a temperature between the glass transition temperature of the resin constituting the multilayered film and the glass transition temperature plus 120° C. is preferred.

The thus obtained biaxially stretched film is preferably subjected to a heat treatment at a temperature of not lower than the drawing temperature and not higher than the melting point in a tenter to provide the planarity and a dimensional stability. After the film is subjected to the heat treatment in such a way, the film is uniformly cooled slowly to room temperature and then rolled up. In the heat treatment and during the annealing process, a relaxation process may be used in combination as required.

Next, the case of a simultaneous biaxial stretching will be described. In the case of simultaneous biaxial stretching, to the obtained cast film, a surface treatment such as corona treatment, flame treatment or plasma treatment is applied and then a function such as slippage, adhesiveness, antistatic properties may be added by inline coating.

Next, the cast film is guided to a simultaneous biaxial tenter and conveyed while holding the both sides of the film with clips, followed by stretching in the longitudinal direction and the transverse direction simultaneously and/or in steps. Examples of the simultaneous biaxial stretching machines include pantograph type, screw type, drive motor type and linear motor type stretching machines, and preferred are the drive motor type and the linear motor type stretching machines by which the draw ratio may be changed arbitrarily in any rate and by which a relaxation process may be performed at any location. Although the draw ratio of the stretching of the film may vary depending on the kind of resins, usually an areal draw ratio of 6× to 50× is preferred, and when polyethylene terephthalate is used as at least one of the resins constituting the multilayered film, an areal draw ratio of 8× to 30× is particularly preferably employed. Particularly, in simultaneous biaxial stretching, to inhibit the orientation variation in the plane, the draw ratio in the longitudinal direction and the draw ratio in the transverse direction are preferably made the same as well as the stretching speed in the longitudinal direction and the stretching speed in the transverse direction almost the same. As the drawing temperature, a temperature between the glass transition temperature of the resins constituting the multilayered film and the glass transition temperature plus 120° C. is preferred.

The thus biaxially stretched film is preferably subjected to a continued heat treatment at a temperature of not lower than the drawing temperature and not higher than the melting point in a tenter to provide the planarity and a dimensional stability. During this heat treatment, to inhibit the distribution of the main orientation axis along the transverse direction, a relaxation process is preferably carried out instantly in the longitudinal direction immediately before and/or immediately after the film enters the heat treatment zone. After the film is subjected to the heat treatment in such a way, the film is uniformly annealed to room temperature and rolled up. In the heat treatment and during the annealing, a relaxation process in the longitudinal direction and/or in the transverse direction may be performed as required. A relaxation process is performed instantly in the longitudinal direction immediately before and/or immediately after the film enters the heat treatment zone.

EXAMPLES

Evaluation methods of the physical properties used in our films are described.
Evaluation Methods of Physical Properties
(1) Optical Density The transmission density of the film was measured using Transmission Densitometer X-Rite 361T (V) produced by X-Rite, Incorporated. Before subjecting the sample to measurement, zero point adjustment and confirmation of the values of the standard plate were conducted in accordance with the description of the instructions attached to this apparatus.
(2) Gloss Value The gloss value (specular gloss at 60°: Gs(60°)) of the film was measured in accordance with JIS 7105 (1981), using digital variable-angle glossmeter UGV-5D produced by Suga Test Instruments Co., Ltd.
(3) Image Clarity The image clarity (optical comb having a width of 0.5 mm; image clarity: C(0.5)) reflected by the film was measured in accordance with JIS 7105 (1981) using Clarity Meter produced by Suga Test Instruments Co., Ltd.
(4) Surface Roughness The surface roughness of the film was measured using a high precision thin film step measuring instrument ET-10 by Kosaka Laboratory Ltd. Measuring condition is described below. The surface of the side of the B layer was subjected to measurement:
  Stylus Tip Radius: 0.5 μM
  Stylus Load: 5 mg
  Measurement Length: 1 mm
  Cutoff: 0.08 mm
  Scanning Speed: 4 μm/sec.
The definition of Ra is described in JIS B0601 (1994).
(5) Outer Appearance A 500 mm×500 mm film was observed by visual inspection. The cases where the film had a deep and glossy jet-black color like the outer appearance of pianos were evaluated as ⊚; the cases where the film had a little insufficient deepness or had an insufficient gloss were evaluated as ◯; and the cases where the film had an insufficient deepness and insufficient gloss were evaluated as X.

(6) Melting Point

Measurements and calculations were conducted using a differential scanning calorimeter (DSC) in accordance with JIS-K-7122 (1987) by the following apparatus in the following conditions:
  Apparatus: "Robot DSC-RDC220" by Seiko Instruments & Electronics Ltd.
  Data Analysis "Disk session SSC/5200"
  Sample Mass: 5 mg
  Heating Rate: 20° C./minute.
(7) L*(SCI), L*(SCE)

A 5 cm×5 cm sample was cut out, and then the back side of the sample was painted in black with Magic Ink (registered trademark). The reflected object color was measured in the condition that a target mask (CM-A106) with a measurement aperture diameter of 8 mm was employed, using CM-3600d by Konica Minolta Co., Ltd. to determine respectively the luminance L*(SCI) and L*(SCE). As the light source, D65 was set, and the average of 3 runs was employed. CM-A103 was used as the white calibration plate, and CM-A104 was used as the zero calibration box.

Examples 1 to 3

As two kinds of resins, resin A and resin B were provided. As the resin A, a polyethylene terephthalate (PET) having an intrinsic viscosity of 0.63 in which 2.5 wt % of carbon black HCF #2600 produced by Mitsubishi Chemical Corporation was finely dispersed was used. As the resin B, a polyethylene terephthalate having an intrinsic viscosity of 0.65 was used. The resin A and the resin B were respectively vacuum dried at a temperature of 180° C. for 3 hours, and fed into separate uniaxial extruders. The melting point of the PET was 256° C.

The resins were melted at 280° C. in the respective extruders, and after passing through a gear pump and a filter respectively, they were joined using a bilayered feed block. As for the lamination ratio, the flow rate of each resin was adjusted such that the thickness of layers shown in Table 1 was attained. The thus obtained bilayered melt multilayered was molded into the form of a sheet with a die, and quickly solidified on a casting drum kept at a surface temperature of 25° C. applying an electrostatic voltage.

The obtained cast film was heated with a group of rolls set at 75° C., and quickly heated from both sides with a radiation heater. When the film temperature was 90° C., the film was stretched in the longitudinal direction at a draw ratio of 3.2 times the original length.

This uniaxially oriented film was guided to a tenter, and after preliminarily heating the film with hot air at 110° C., the film was stretched in the transverse direction at a draw ratio of 3.8 times the original length. The stretched film was heat-treated with hot air at 230° C. in the tenter, and then subjected to a relaxation by 7% in the transverse direction at the same temperature, followed by annealing to room temperature and winding of the film about a roll. The obtained results are shown in Table 1.

Example 4 to 6

As two kinds of resins, resin A and resin B were provided. As the resin A, a polyethylene terephthalate (PET) having an intrinsic viscosity of 0.63 in which 2.5 wt % of carbon black HCF #2600 produced by Mitsubishi Chemical Corporation was finely dispersed was used. As the resin B, a polyethylene naphthalate having an intrinsic viscosity of 0.68 was used.

The resin A and the resin B were respectively vacuum dried at a temperature of 180° C. for 3 hours, and fed into separate uniaxial extruders. The melting point of the PEN was 263° C.

The resins were melted at 280° C. in the respective extruders and, after passing through a gear pump and a filter respectively, they were joined using a bilayered feed block. As for the lamination ratio, the flow rate of each resin was adjusted such that the thickness of layers shown in Table 1 was attained. The thus obtained bilayered melt multilayered was molded into the form of a sheet with a die, and quickly solidified on a casting drum kept at a surface temperature of 25° C. applying an electrostatic voltage.

The obtained cast film was heated with a group of rolls set at 90° C., and quickly heated from both sides with a radiation heater. When the film temperature was 125° C., the film was stretched in the longitudinal direction at a draw ratio of 4 times the original length. Then a corona discharge treatment was performed in the air on both surfaces of this uniaxially oriented film to attain a wetting tension of the base film of 55 mN/m. The thus treated surfaces were coated with a water-dispersible urethane resin (concentration: 3.0% by weight) containing a lubricating agent (colloidal silica having a particle diameter of 0.1 μm with a silica solid content of 0.4 parts by weight) with a #4 metering rod, thereby forming a transparent, lubricating, adhesion-promoting layer. The thickness of this layer was 100 nm in the state of rolled up film.

This uniaxially oriented film was guided to a tenter and, after preliminarily heating the film with hot air at 135° C., the film was stretched in the transverse direction at a draw ratio of 4.5 times the original length. The stretched film was heat treated with hot air at 230° C. in the tenter, and then subjected to a relaxation by 7% in the transverse direction at the same temperature, followed by annealing to room temperature and winding of the film about a roll. The obtained results are shown in Table 1.

Examples 7 and 8

A film was prepared in the same manner as in Example 1 except that the content of the carbon black in the resin A was changed as shown in Table 1. The obtained results are shown in Table 1.

Examples 9 and 10

A film was prepared in the same manner as in Example 1 except that a polyethylene terephthalate having an intrinsic viscosity of 0.65 containing silica particles with an average particle size of 1 μm was used as the resin B. The obtained results are shown in Table 1.

Comparative Examples 1 to 3

Films were prepared in the same manner as in Example 1 except that the thickness of each layer was changed as shown in Table 1 by adjusting the flow rate of each resin and the film thickness. The obtained results are shown in Table 1.

Comparative Example 4

A film was prepared in the same manner as in Example 1 except that the resin A alone was used. The obtained results are shown in Table 1.

Comparative Example 5

A film was prepared in the same manner as in Example 1 except that a polyethylene terephthalate having an intrinsic viscosity of 0.65 containing silica particles with an average particle size of 1 μm in an amount of 0.1 wt % was used as the resin B. The obtained results are shown in Table 1.

Example 11

A film was prepared in the same manner as in Example 1 except that a polyethylene terephthalate having an intrinsic viscosity of 0.65 containing dimethyl silicone in an amount of 0.02 wt % was used as the resin B. The obtained results are shown in Table 1. The obtained film was hardly marked with a fingerprint and was hardly stained.

Example 12

A film was prepared in the same manner as in Example 1 except that a polyethylene terephthalate (PE/CHDM.T) having an intrinsic viscosity of 0.72 containing 2.5 wt % of finely dispersed carbon black HCF #2600 produced by Mitsubishi Chemical, in which 30 mol % of cyclohexane dimethanol was copolymerized, was used as the resin A. The resin A did not substantially have a melting point and was an amorphous resin. The obtained results are shown in Table 1. The obtained film had the best outer appearance among the films of the all Examples.

Example 13

A film was prepared in the same manner as in Example 1 except that a polyethylene terephthalate (PET/.I) having an intrinsic viscosity of 0.70 containing 2.5 wt % of finely dispersed carbon black HCF #2600 produced by Mitsubishi Chemical, in which 15 mol % of isophthalic acid was copolymerized, was used as the resin A. The melting point of the resin A was 215° C. The obtained results are shown in Table 1.

Example 14

A polyethylene terephthalate (PE/CHDM.T) having an intrinsic viscosity of 0.72 containing finely dispersed carbon black HCF #2600 produced by Mitsubishi Chemical, in which 30 mol % of cyclohexane dimethanol was copolymerized, was provided. Then a film was prepared in the same manner as in Example 1 except that a blend of a polyethylene terephthalate (30 wt %) having an intrinsic viscosity of 0.65 and the polyethylene terephthalate (70 wt %) in which the carbon black was finely dispersed and in which cyclohexane dimethanol was copolymerized in an amount of 30 mol % was used as the resin A. The melting point of the resin A was 255° C. and 2.5 wt % of carbon black was finely dispersed in the resin A. The obtained results are shown in Table 1.

Example 15

A resin which was a polypropylene terephthalate (PPT) having a melting point of 227° C. and an intrinsic viscosity of 1.4, which polypropylene terephthalate was SORONA P90D produced by DuPont, containing 2.5 wt % of finely dispersed carbon black HCF #2600 produced by Mitsubishi Chemical, was provided. Then a film was prepared in the same manner as in Example 1 except that a blend of a polyethylene terephthalate (90 wt %) having an intrinsic viscosity of 0.65 and the polypropylene terephthalate (10 wt %) in which the carbon black was finely dispersed was used as the resin A. The melting point of the resin A was 254° C. and 2.5 wt % of carbon black was finely dispersed in the resin A. The obtained results are shown in Table 1.

Example 16

A film was prepared in the same manner as in Example 1 except that a three-layered feed, block was used to attain a constitution wherein a core layer was composed of the resin A and both surface layers were composed of the resin B, and that the thickness of each layer was adjusted as shown in Table 1. The obtained results are shown in Table 1. With this film, curl was more unlikely to occur when compared with the film of Example 15 even after a heat treatment. In the table, although the thickness of the B layer was that of the B layer on one side, the B layers on both sides had almost the same thickness.

TABLE 1-1

|  | Resin A | Resin B | A layer thickness (μm) | B layer thickness (μm) | Film thickness (μm) |
| --- | --- | --- | --- | --- | --- |
| Example 1 | PET + CB 2.5 wt % | PET | 125 | 1 | 126 |
| Example 2 | PET + CB 2.5 wt % | PET | 125 | 25 | 150 |
| Example 3 | PET + CB 2.5 wt % | PET | 125 | 125 | 250 |
| Example 4 | PET + CB 2.5 wt % | PEN | 125 | 1 | 126 |
| Example 5 | PET + CB 2.5 wt % | PEN | 125 | 25 | 150 |
| Example 6 | PET + CB 2.5 wt % | PEN | 125 | 125 | 250 |
| Example 7 | PET + CB 1.0 wt % | PET | 125 | 25 | 150 |
| Example 8 | PET + CB 5 wt % | PET | 125 | 25 | 150 |
| Example 9 | PET + CB 2.5 wt % | PET + silica particles 0.01 wt % | 125 | 25 | 150 |
| Example 10 | PET + CB 2.5 wt % | PET + silica particles 0.001 wt % | 125 | 25 | 150 |
| Comparative Example 1 | PET + CB 2.5 wt % | PET | 125 | 0.3 | 125.3 |
| Comparative Example 2 | PET + CB 2.5 wt % | PET | 18 | 250 | 268 |
| Comparative Example 3 | PET + CB 2.5 wt % | PET | 400 | 0.3 | 400.3 |
| Comparative Example 4 | PET + CB 2.5 wt % | — | 125 | 1 | 126 |
| Comparative Example 5 | PET + CB 2.5 wt % | PET + silica particles 0.1 wt % | 125 | 25 | 150 |
| Example 11 | PET + CB 2.5 wt % | PET + DMS0.02 wt % | 125 | 25 | 150 |
| Example 12 | PE/CHDM•T + CB 2.5 wt % | PET | 125 | 25 | 150 |
| Example 13 | PET/I + CB 2.5 wt % | PET | 125 | 25 | 150 |
| Example 14 | PE/CHDM•T + PET + CB 2.5 wt % | PET | 125 | 25 | 150 |
| Example 15 | PPT + PET + CB 2.5 wt % | PET | 125 | 25 | 150 |
| Example 16 | PPT + PET + CB 2.5 wt % | PET | 125 | 25 | 175 |

PET: Polyethylene terephthalate
CB: Carbon black
PEN: Polyethylene naphthalate
DMS: Dimethyl silicone
PE/CHDM•T: Cyclohexane dimethanol-copolymerized polyethylene terephthalate
PET/I: Isophthalic acid-copolymerized polyethylene terephthalate
PPT: Polypropylene terephthalate

TABLE 1-2

|  | Surface Roughness Ra (nm) | Optical Density | Gloss Value (%) | L (SCI) | L (SCE) | Image Clarity (%) | Outer appearance |
| --- | --- | --- | --- | --- | --- | --- | --- |
| Example 1 | 8 | 6.3 | 100 | 33 | 12 | 90 | ○ |
| Example 2 | 8 | 6.3 | 115 | 33 | 9 | 96 | ○ |
| Example 3 | 8 | 6.3 | 115 | 33 | 7 | 97 | ⊚ |
| Example 4 | 9 | 6.3 | 125 | 35 | 13 | 90 | ○ |
| Example 5 | 9 | 6.3 | 125 | 35 | 9 | 96 | ⊚ |
| Example 6 | 9 | 6.3 | 125 | 35 | 8 | 96 | ⊚ |
| Example 7 | 8 | 4 | 115 | 32 | 8 | 96 | ○ |
| Example 8 | 8 | 6.3 | 115 | 32 | 8 | 96 | ⊚ |
| Example 9 | 24 | 6.2 | 105 | 32 | 9 | 89 | ○ |
| Example 10 | 18 | 6.2 | 110 | 32 | 9 | 90 | ○ |
| Comparative Example 1 | 33 | 6.3 | 94 | 32 | 15.5 | 81 | X |
| Comparative Example 2 | 6 | 2 | 97 | 32 | 10 | 88 | X |
| Comparative Example 3 | 35 | 6.4 | 94 | 32 | 16 | 81 | X |
| Comparative Example 4 | 40 | 6.3 | 93 | 32 | 19 | 80 | X |
| Comparative Example 5 | 42 | 6.3 | 95 | 32 | 18 | 83 | X |

TABLE 1-2-continued

|  | Surface Roughness Ra (nm) | Optical Density | Gloss Value (%) | L (SCI) | L (SCE) | Image Clarity (%) | Outer appearance |
|---|---|---|---|---|---|---|---|
| Example 11 | 10 | 6.3 | 114 | 32 | 9 | 95 | ○ |
| Example 12 | 7 | 6.4 | 114 | 29 | 5 | 99 | ◎ |
| Example 13 | 7 | 6.4 | 114 | 29 | 6 | 98 | ◎ |
| Example 14 | 7 | 6.4 | 113 | 31 | 6 | 98 | ◎ |
| Example 15 | 7 | 6.4 | 113 | 32 | 7 | 98 | ◎ |
| Example 16 | 7 | 6.4 | 113 | 32 | 7 | 98 | ◎ |

Industrial Applicability

We provide black ornamental films. The films are suitable as ornamental films having a deep and glossy jet-black color like the outer appearance of pianos.

The invention claimed is:

1. A biaxially oriented multilayered film comprising:
   at least one polyester resin layer (A layer) comprising a black component and an amorphous polyester resin or a resin having a melting point of not higher than 240° C., and having a thickness of not less than 20 μm and not more than 300 μm: and
   at least one substantially colorless and transparent polyester resin layer (B layer) and having a thickness of not less than 0.5 μm and not more than 200 μm;
   said A layer and said B layer being, arranged adjacent to each other and surface roughness Ra of at least one surface of said film is not less than 1 nm and not more than 25 nm, and wherein at least one surface thereof has an L*(SCI) of not less than 29 and not more than 35, L*(SCE) of not less than 2 and not more than 15, and L*(SCI)/L*(SCE) of not less than 3 and not more than 17.

2. The multilayered film according to claim 1, wherein said multilayered film comprises polyester in an amount of not less than 70 wt %.

3. The multilayered film according to claim 1, wherein said A layer and said B layer comprise at least one selected from the group consisting of polyethylene terephthalate, copolymers of ethylene terephthalate, polyethylene naphthalate and copolymers of ethylene naphthalate.

4. The multilayered film according to claim 1, wherein said multilayered film contains a silicone compound in an amount of not less than 0.01 wt % and not more than 10 wt %.

5. The multilayered film according to claim 1, further comprising at least one resin layer (C layer) which contains at least one of acrylic compounds, polyester compounds and urethane compounds, and which has a thickness of not less than 10 nm and not more than 300 nm.

6. A molded article comprising said multilayered an according to claim 1.

* * * * *